July 5, 1960   F. MITTAG ET AL   2,943,814
DATA SENSING ARRANGEMENT
Filed Aug. 1, 1957   4 Sheets-Sheet 1

INVENTOR
F. Mittag - H. Ringhandt
BY
ATTORNEY

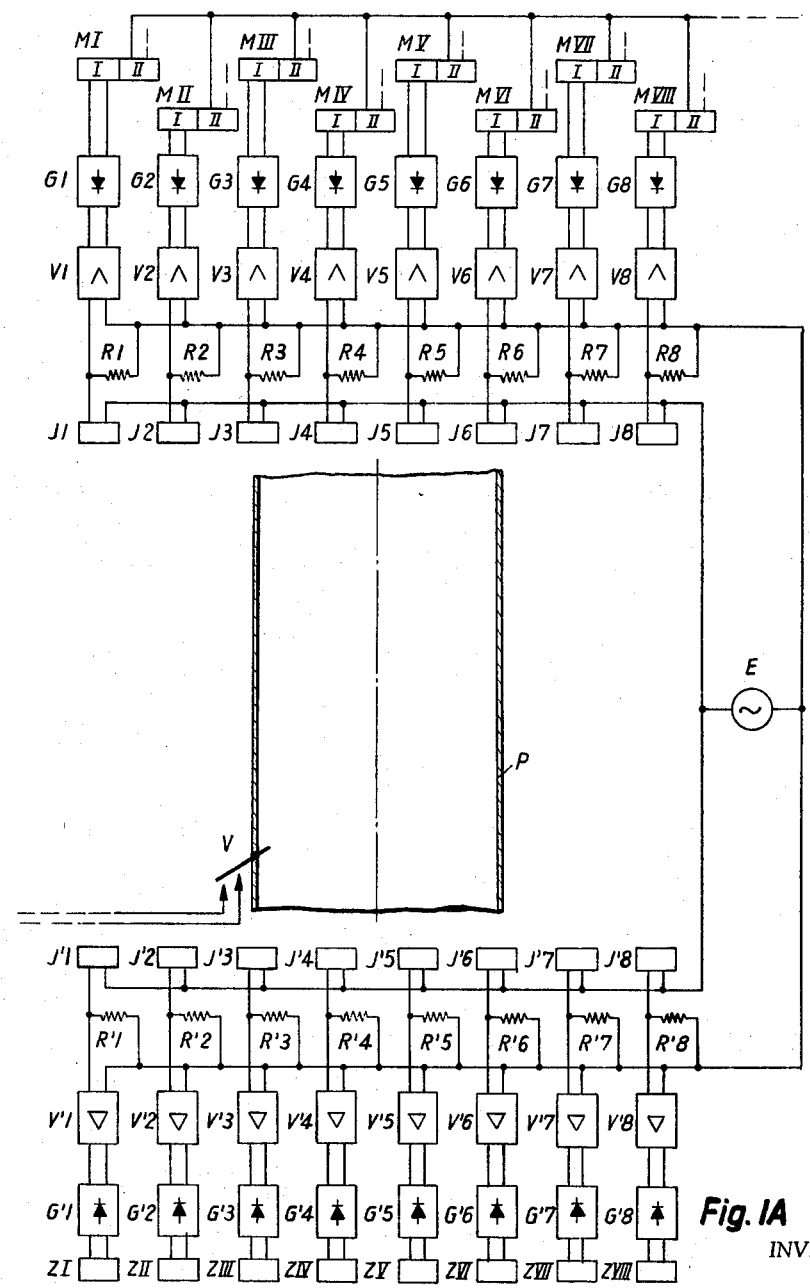
Fig. IA

INVENTOR
F. Mittag - H. Ringhandt ly. These collars are independently rotatable between the flanges of fixed collar F. The indicia on the collars is adapted to be set with respect to the fixed index line S contained on the exterior of the wall of the carrier B. The collars R1, R2 are made of a non-magnetic material and have imbedded therein magnets Z1, Z2, respectively.

United States Patent Office 2,943,814
Patented July 5, 1960

2,943,814

DATA SENSING ARRANGEMENT

Fritz Mittag, Berlin-Friedenau, and Horst Ringhandt, Berlin-Reinickendorf, Germany, assignors to International Standard Electric Corporation, New York, N.Y., a corporation of Delaware Filed Aug. 1, 1957, Ser. No. 675,723

Claims priority, application Germany Aug. 9, 1956

13 Claims. (Cl. 243—16)

This invention relates to the sensing of destination characteristics applied to articles in conveying systems, such charactertistics being determinative of the route of the article through the conveying system. More particularly, the invention concerns the sensing of characteristic code markings of dispatch carriers in pneumatic tube systems.

In pneumatic tube systems it is known to utilize dispatch carriers with settable contact members, which when sensed, control electrical circuits that operate route switches in the tube system thereby controlling the destination of the carrier in accordance with the ring settings. These contact rings are coaxial with the axis of the carrier and any angular rotation of the carrier as it proceeds through the system may be disregarded. Where, however, settable magnets are used in dispatch carriers, a problem arises in that the angular rotation of the carrier as it travels through the tube could cause a completely erroneous destination to be selected, due to the fact the magnets may affect sensing means with which they were not intended to coact. These sensing means are disposed about the periphery of the pneumatic tube and this invention provides an automatic index of the position of the dispatch carrier and the magnets therein with respect to the fixed sensing means disposed about the tube, as aforesaid. By providing the index of the position of the magnets with respect to the sensing means, the correct switching information may be derived from the coaction of the magnets upon the proper sensing means. This invention is peculiarly adaptable for carriers having a circular cross-section but it may be used for carriers having a non-round cross-section as well. In such non-round carriers the invention is able to resolve ambiguity in the placement of the carrier within the system.

Accordingly, it is an object of the invention to provide a sensing arrangement for carriers in pneumatic tube systems utilizing magnetic markings to control the route switching of such carriers throughout the system regardless of the angular position of the carrier within the tube at the time of its sensing.

It is a further object of the invention to provide an automatic indexing arrangement of carriers having magnetic destination markings thereon by providing additional magnetic characteristics at a point on the carrier offset from the first-mentioned markings.

The above-mentioned and other features and objects of this invention will become apparent by reference to the following description taken in conjunction with the accompanying drawings, in which:

Fig. 1A is a schematic block diagram of two sets of sensing means associated with a tube section;

Figure 1:
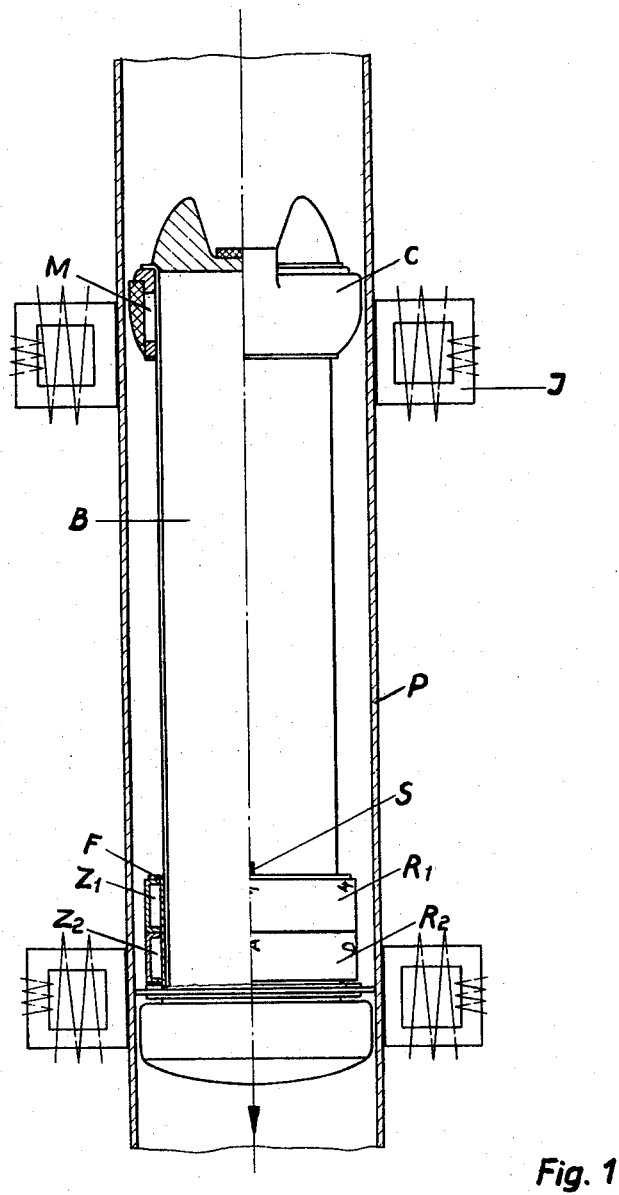
Fig. 1 is a diagrammatic view partly in section of a portion of a pneumatic tube, a dispatch carrier carrying magnetic markings and sensing means external to the tube for detecting such markings.

Referring now to Fig. 1 there is shown a diagrammatic view, partly in section, of a length of magnetic tube P within which is situated a dispatch carrier B having a circular cross-section. Adjacent one end of the carrier B, there are situated rotatable setting collars R1, R2, having inscribed thereon numerals and letters, respectively. These collars are independently rotatable between the flanges of fixed collar F. The indicia on the collars is adapted to be set with respect to the fixed index line S contained on the exterior of the wall of the carrier B. The collars R1, R2 are made of a non-magnetic material and have imbedded therein magnets Z1, Z2, respectively.

At the other end C of the carrier B there is imbedded a third magnet M which is adapted to cooperate with fixed sensing means in a manner similar to the magnets Z1, Z2. The carrier is adjusted as to its destination through turning the rings R1, R2, whereby the magnets Z1, Z2 can be set each time to another rotational or angular position with respect to magnet M.

The magnets M, Z1, Z2 are magnetized radially and, for instance, the magnet M may have its portion adjacent the wall of the tube P polarized in a northerly direction. The magnet Z2 may be similarly polarized and the magnet Z1 may be polarized in a southerly direction for the selection shown on the collars R1, R2 in Fig. 1, corresponding to the destination A1 and which indicia are in alignment with the index mark S.

Figure 2:
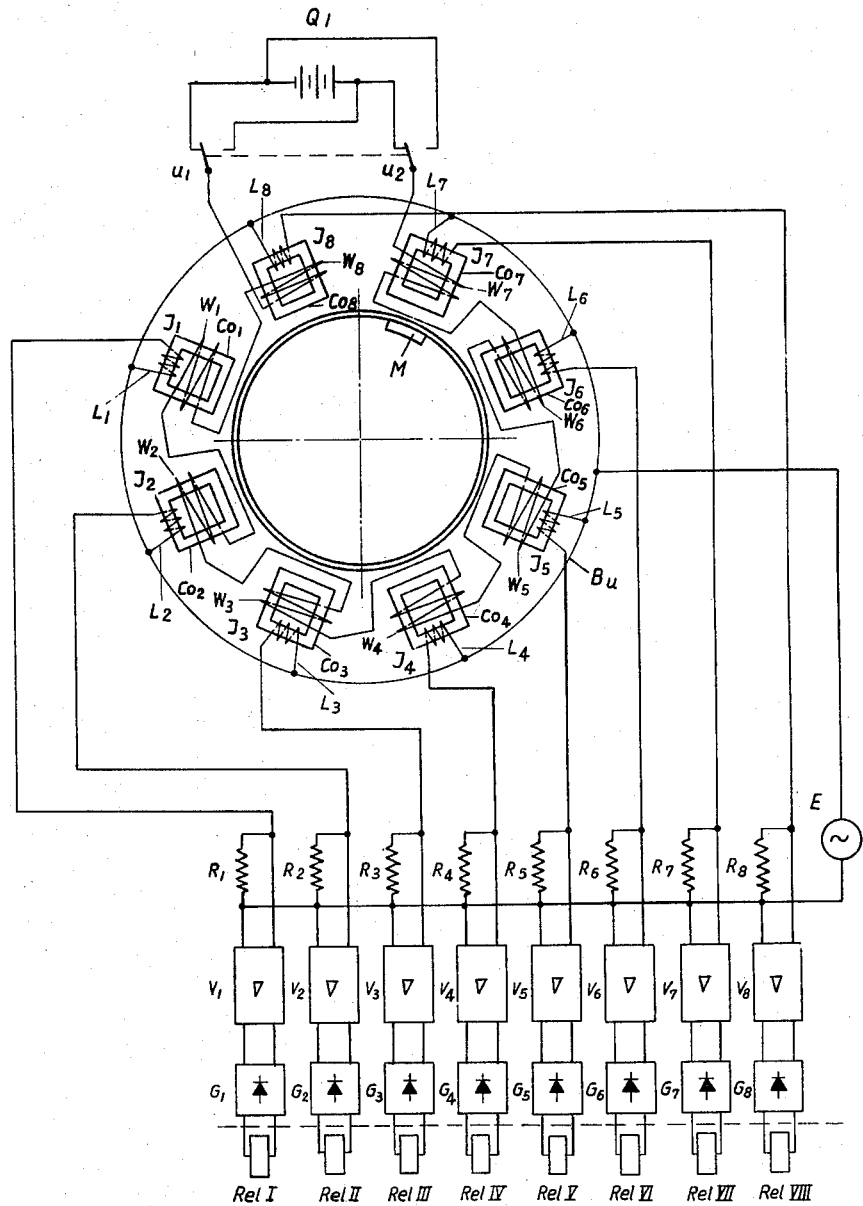
Fig. 2 is a diagrammatic view partly in cross-section of a portion of a pneumatic tube and a set of sensing means similar to the lower set of sensing means shown in Fig. 1A.

Around the periphery of the tube P are two sets of sensing elements J1 . . . J8 and J'1 . . . J'8, of which only two are shown in Fig. 1, but all are shown in block form in Fig. 1A. The aforesaid sensing elements are saturable reactors having cores CO, saturating windings W and alternating current windings J. As will be seen in Fig. 2, the saturable reactor J1, for instance, comprises the core CO1, saturating winding W1 and the alternating current winding J1. Each of the windings W associated with the group of sensing elements J1 . . . J8 are serially connected to a source of direct current Q1 over transfer contacts $u1$, $u2$, associated with transfer relay U, shown in Fig. 3. The connection of the source Q1 through the windings W over said contacts is such that the current flow through said windings is reversed upon movement of the contacts $u1$, $u2$, to their transfer position. As shown in Fig. 2, each of the cores is pre-magnetized in an identical direction. One terminal of the alternating current winding J of each of the coils is connected to a common bus BU by means of the leads L1 . . . L8. Each of the other terminals of said coils is connected to the input of amplifiers V1 . . . V8. A source of alternating potential E has one pole thereof attached to the common bus BU and the other pole connected to each of the inputs of said amplifiers, as shown in Fig. 2. The input of each amplifier is shunted by a separate resistance, R1 . . . R8, as shown in Fig. 2. The outputs of the several amplifiers are coupled through rectifiers G1 . . . G8 to relays RelI . . . RelVIII, respectively. The characteristics of the saturable reactors are such that despite the flow of current through the pre-magnetizing windings W, sufficient impedance is offered to the flow of alternating current from the alternator E to prevent a substantial voltage drop across the resistors R1 . . . R8. If now the magnet M is disposed adjacent a sensing element, as shown in Fig. 2, namely, the element J7, and if the direction of the flux of the magnet M is in aiding relation with the flux developed by the premagnetizing winding W7, the impedance in the winding J7 will decrease and alternating current will flow therethrough and through the corresponding resistance R7, causing a voltage drop thereacross. This potential drop is amplified by the amplifier V7 and the amplified output is rectified by rectifier G7 and is applied as a D.C. potential to relay RelVII causing said relay to operate. If the flux direction of the magnet M were in opposing relation to the flux developed in the core CO7 by the winding W7, no output would be derived from the amplifier V7, and consequently, the associated relay RelVII would remain unoperated.

It will be understood that the operation of the second group of sensing elements J'1 . . . J'8 is identical to that described in connection with the group of elements J1 . . . J8. The only difference in the two groups of sensing elements, lies in the fact that, as shown in Fig. 1A, the relays which are coupled to the output of the amplifiers through the rectifiers G1 . . . G8 are shown to consist of double winding relays, each winding indicated with I and II. The relays have now been identified as relays M1 . . . M8 to render it clear that these are the relays which respond to the angular position of the magnet M. In the lower part of Fig. 1A the relays ZI . . . ZVIII are shown, and these operate in response to the angular position of magnets Z1, Z2.

Figure 3:
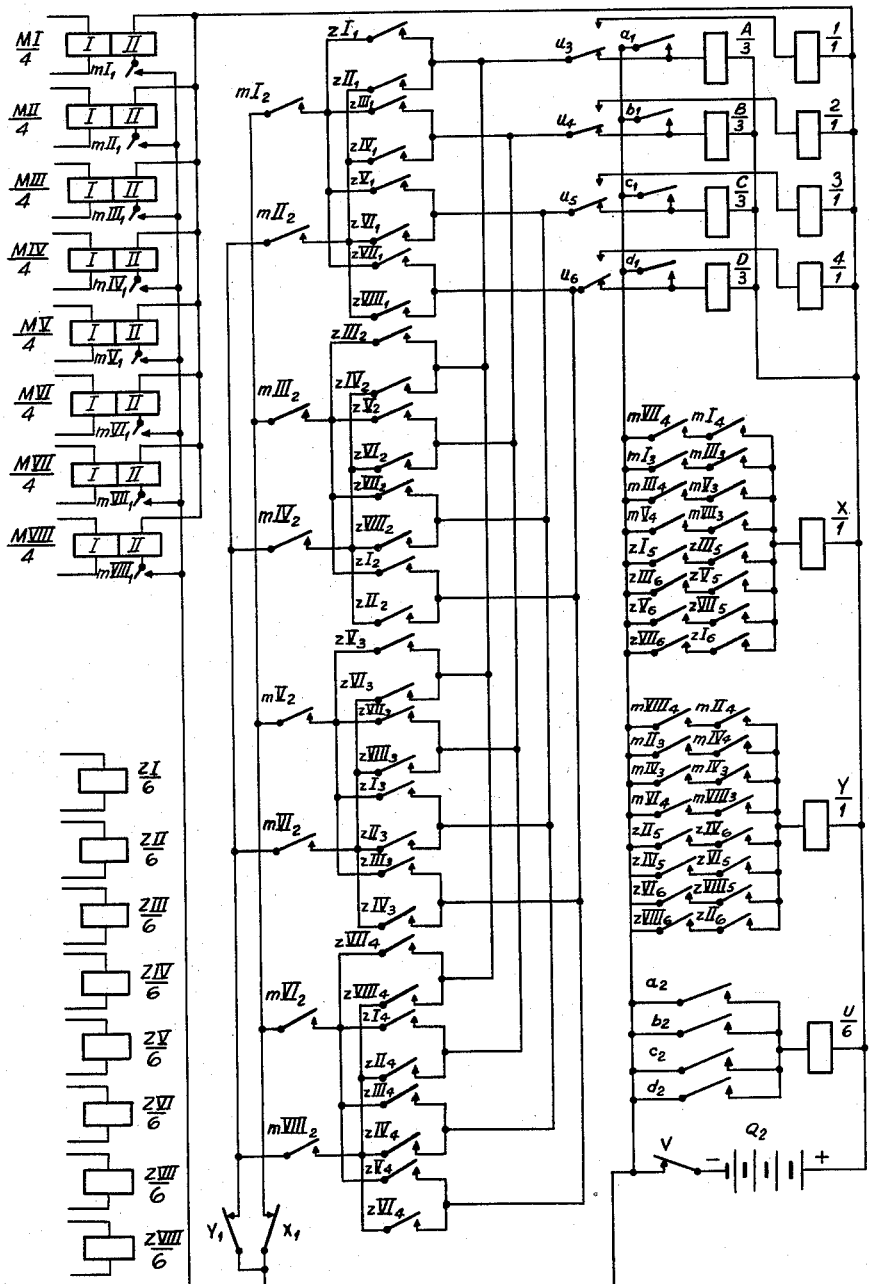
Fig. 3 is a wiring diagram of switch control relays under control of relays shown in Fig. 1A, whereby carriers may be properly routed to their destination in accordance with the magnetic markings thereon.

If it is desired to sense the destination of the carrier B it is caused to come to rest, as shown in Fig. 1, by means not disclosed but which is well known in the art, so that its destination characteristics may be sensed. When the carrier is in the sensing position, the magnet M may be either directly opposite a sensing element, as shown in Fig. 2 for instance, or, it may be at an angular position between two sensing elements, since there is no assurance that the magnet M will achieve a particular angular position due to the possibility of rotation of the carrier B within the tube as it travels therethrough. As the magnet M is in proximity to sensing element J7, as shown in Fig. 2, so are the magnets Z1, Z2, in proximity with sensing element of the second group thereof. Assuming that the destination A2 has been set on the collars R1, R2, and further assuming that the magnet M is adjacent the sensing element J7, as shown in Fig. 2, amplifier V7 will deliver an output and cause relay MVII to operate. Let it be further assumed that the magnet Z2 is adjacent the sensing element J'7 and causes the relay ZVII to operate because the flux of magnet Z2 is in aiding relation with the sensing element J'7. The magnet Z1 will be ineffective inasmuch as it is assumed that it is polarized in a direction opposite to that of the flux in the core of the sensing element J'1. The operation of relays MVII and ZVII control the operation of further relays as shown in Fig. 3. In the drawing the relays have been designated by an upper case letter over a straight line under which is a number, the number representing the number of contacts which are physically controlled by the relay. These contacts are shown distributed over the various figures in the circuits which they control, rather than the close association with the relays to which they belong. The contacts are designated by the lower case letter of the relay to which they belong, followed by a number to differentiate the contacts of the same relay.

To return now to the result of the operation of relays MVII and ZVII, as shown in Fig. 3, the closure of contact $m$VII2 and the closure of contact $z$VII4 complete a series circuit for the operation of relay A over further contacts $u$3, winding of relay A, source Q2, back contacts $vx$1, contact $m$VII2. The operation of relay MVII also causes a holding circuit to be completed for the relay MVII via contact $m$VIII, which completes an enengizing circuit for winding II of said relay, as shown in Fig. 3. The operation of relay A completes a holding circuit for said relay via contact $a$1 over an obvious circuit. Contact $a$2 completes a circuit for operation of relay U which thereupon causes the transfer of its contacts $u$1, $u$2, in Fig. 2, thereby reversing the flux pattern in the cores CO1 . . . CO8, as previously explained. Transfer contacts $u$3 . . . $u$6 are also moved to their opposite position. Magnet Z2 now opposes the flux in the core of the sensing element J'7 and the magnet Z1 will now excite the core of the sensing element J'1 since its polarity now aids the flux generated by the winding W1. The movement of the contacts $u$1, $u$2, renders the magnet Z1 effective and the magnet Z2 ineffective. Thus magnet Z1 will cause relay Z1 to operate. Movements of the contacts $u$3 . . . $u$4 serve to connect the relays 1, 2, 3 and 4 to the network of contacts, as shown in Fig. 3, so that in the example previously given, the magnet Z2 will have caused operation of relay A, and now the magnet Z1 will cause the operation of relay 2. If the destination C3 had been selected by setting the settable collars R1, R2, the relays C and 3 would be sequentially energized in a manner above described with respect to the relays A and 2.

In series with a terminal of the potential source Q2 there is a contact $v$ which contact may be controlled by a movable arm in the path of the carrier as it leaves the sensing chamber in the tube P. Contact $v$ thereby causes release of all the second windings II of the M relays as well as relays A . . . D, respectively.

Let us now consider the possibility that the carrier B will arrive in the sensing chamber of the tube P in an angular position wherein the magnet M lies between two adjacent sensing elements J1, J8, for example. The strength of the flux radiated by magnet M is sufficiently strong to affect the cores CO1 and CO8, associated with the aforesaid sensing elements. In the example given both relays MI and MVIII will operate since voltages are derived from their associated amplifiers V1 and V8. By the same token, each one of the magnets Z1, Z2 will also lie between adjacent associated test elements and, consequently, two of the Z relays will operate. Let us assume that both relays ZI and ZII were operated as a consequence of one of the magnets Z1, Z2 lying between test elements J'1 and J'8. The operation of relay ZI and operation of relay MI causes operation of the relay A over contacts $m$I2, $z$I1, transfer contact $u$3, relay A, In this way a connection results which extends over contacts $m$VIII2, $z$VIII4, to $u$3 and the winding of relay A.

It is possible that the magnet M might cause two relays to operate by virtue of its angular position between adjacent sensing elements while only one of the relays A . . . D or 1 . . . 4 will operate under the action of the magnets Z1, Z2, or vice versa. In either of these events the indication will be correct. Furthermore, with magnet M adjacent any one of the test elements, such for instance as J7, not only will core CO7 be magnetized but the adjacent cores CO6 and CO8 may also be affected. The operation of relays MVI and MVIII will cause the operation of the relay Y over contacts $m$VI4, $m$VIII3, winding relay Y, battery. Thereupon, contact $y$1 opens. One of the relays X or Y will be energized whenever a pair of relays operate, comprising either two M relays or two Z relays with indices either even numbered or odd numbered under the influence of a signal sensing of a carrier. The example just cited—the operation of relay Y—results in the disconnection of all those $m$ contacts which, with the $z$ contacts, constitute an operating circuit for the relays A1 . . . D1, namely, contacts $m$II2, $m$IV2, $m$VI2 and $m$VIII2. Operation of the X relay opens the circuit by its contact $x$1 for relays A1 . . . D1 over contacts $m$I2, $m$III2, $m$V2 and $m$VII2. Thus the relays X and Y render the energization of a center test element effective while rendering null the operation of adjacent test elements. The flux concentration of any of the magnets is not sufficient to simultaneously excite four adjacent test elements so that the provision of the relays X and Y covers all contingencies.

Any number of possible operating positions may be provided for the settable collars R1, R2. For instance, ten such positions may be provided in conjunction with twenty sensing elements. In any case, the number of sensing elements should be double that of the positions which are settable by the collars. Any position in which the magnets Z1, Z2, are in a straight line, may not be used because, in this case, the magnetic fields of said magnets are equal and opposite, and therefore, mutually annul the effect of the other as far as the sensing elements are concerned. In the example here represented these ineffective positions are A-1, B-2, C-3 and D-4.

It is also possible to provide a third settable collar with a third cooperating magnet, or to provide a number of additional settable collars having cooperating magnets Zn. It will be understood that the increase of magnets enables more code combinations to be realized. Where three settable collars are employed, one is arranged in the plane of the magnet M. In such a case the polarization of the additional magnet would be opposite that of the magnet M. The third collar, similar to the collars R1, R2, would be rotatable. This settable collar would have one less possible angular adjustable position than the settable collars R1, R2. It will be noted from Fig. 3 that relays A . . . D have three sets of contacts of which two sets are utilized in the circuit of Fig. 3, but the third set (not shown) is used to control electrical circuits which operate route switches (not shown) in the pneumatic tube system and thus control the destination of the carrier in accordance with the angular settings of the magnets Z1, Z2. Similarly, relays 1 . . . 4, are shown as having single contacts, respectively, and which contacts are likewise not shown, but it will be understood that such contacts control the switching circuit in similar fashion to the third set of contacts of the relays A . . . D, as above described.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An arrangement for sensing recorded data on a movable article which travels along a path comprising in combination, a fixed magnetic index disposed on said article, movable magnetic means disposed on said article longitudinally spaced from and angularly displaceable with respect to said index, a first group of magnetic sensing means circumjacently fixed with respect to said path, and adapted to sense the angular position of said index with respect to said path, a second group of magnetic sensing means circumjacently fixed with respect to said path and spaced from said first sensing means a distance substantially equal to the spacing between said index and said movable magnetic means on said article, said second sensing means adapted to sense the angular position of said movable means with respect to said index, two groups of electromagnetic relays, each relay having a plurality of contacts, the relays of the first of said groups under control of a different one of said first sensing means, respectively, and the relays of the other of said groups under control of a different one of said second sensing means, respectively, a plurality of electromagnetic switch means for controlling the destination of said article along said path, a circuit for operating said electromagnetic switch means including a network of contacts associated with relays of both said groups whereby the angular position of said movable magnetic means controls operation of said switch means in a predetermined manner and independent of the angular position of said article in said path.

2. An arrangement as claimed in claim 1, wherein said path comprises a pneumatic tube and said article comprises a pneumatic tube dispatch carrier, both said tube and said carrier having a circular cross-section.

3. An arrangement as claimed in claim 2 wherein both groups of said sensing means comprises a plurality of inductive reactors, each having a pre-magnetizing winding and a reactive winding, each winding wound about a common core, said reactors angularly spaced about the exterior of a portion of said tube in a plane normal to the axis thereof, a series connection among said pre-magnetizing windings, a source of pre-magnetizing potential, first switch means for selectively connecting said series connection with said source in opposite polarities, a source of alternating current, a plurality of amplifiers having an input and an output, there being an amplifier for each of said reactors, the input of each amplifier coupled between a terminal of said alternating current source and a terminal of the reactive winding of the associated reactor, a plurality of resistances, each coupled across the input of a different one of said amplifiers, a plurality of electromagnetic relay means, each means coupled to the output of a different one of said amplifiers and adapted to be operated thereby.

4. An arrangement as claim in claim 3, wherein each of the relays of said first group has a double winding, one of said windings being coupled to the output of its associated amplifier and having one of its contacts included in a holding circuit in series with its other winding, whereby to maintain said relay actuated after sensing of the angular position of said index.

5. An arrangement as claimed in claim 1, wherein said path comprises a pneumatic tube and said article comprises a pneumatic tube dispatch carrier, both said tube and said carrier having a non-circular cross-section.

6. An arrangement as claimed in claim 1, wherein said magnetic index comprises a first magnet fixedly mounted on said article and exerting lines of magnetic force in a direction substantially normal to the axis of said article in a given polarity.

7. An arrangement as claimed in claim 1, wherein said movable magnetic means comprises a pair of magnets independently rotatable within said article in directions normal to the axis thereof, and exerting lines of magnetic force in directions substantially normal to said axis.

8. An arrangement as claimed in claim 1, wherein each of the relays of said first group has a double winding, one winding being coupled to the output of its associated amplifier, and has one of its contacts included in a holding circuit in series with the other winding of said relay.

9. An arrangement as claimed in claim 8, further comprising a re-set contact for releasing said holding circuit, said re-set contact under control of a carrier moving in said tube.

10. An arrangement as claimed in claim 1, wherein said circuit for operating said electromagnetic switch means comprises a series parallel connection of the contacts associated with relays of both said groups.

11. An arrangement as claimed in claim 10, wherein said circuit for operating said electromagnetic switch means further comprises, contacts associated with relays of said first group for switching the operating circuit of relays of the other of said groups to said series parallel contact connection.

12. An arrangement as claimed in claim 11, further comprising an operating circuit for said switch means, said operating circuit including a parallel connection of contacts controlled by relays of said first group.

13. An arrangement as claimed in claim 12, further comprising a pair of ambiguity-resolving relays, each relay having contacts included in said series-parallel contact network, an operating circuit for said last-named relays including a plurality of series-parallel circuits including additional contacts of the electromagnetic relays coupled to the output of said amplifiers, each series portion of said circuits comprising contacts of alternate relays in odd and even combination.

References Cited in the file of this patent

UNITED STATES PATENTS

| | | |
|---|---|---|
| 1,797,864 | Harlandt | Mar. 24, 1931 |
| 1,983,342 | Chambers | Dec. 4, 1934 |
| 2,085,265 | Mauch et al. | June 29, 1937 |
| 2,241,917 | Mehlis et al. | May 13, 1941 |